US011864965B2

(12) United States Patent
Johnson et al.

(10) Patent No.: US 11,864,965 B2
(45) Date of Patent: Jan. 9, 2024

(54) ELECTRIC TOOTHBRUSH

(71) Applicant: WATER PIK, INC., Fort Collins, CO (US)

(72) Inventors: Jeremy J. Johnson, Fort Collins, CO (US); John Thomas Fiers, Loveland, CO (US)

(73) Assignee: WATER PIK, INC., Fort Collins, CO (US)

(*) Notice: Subject to any disclaimer, the term of this patent is extended or adjusted under 35 U.S.C. 154(b) by 580 days.

(21) Appl. No.: 17/016,704

(22) Filed: Sep. 10, 2020

(65) Prior Publication Data
US 2021/0093431 A1 Apr. 1, 2021

Related U.S. Application Data

(60) Provisional application No. 62/908,415, filed on Sep. 30, 2019.

(51) Int. Cl.
*A61C 17/34* (2006.01)
*H02K 33/02* (2006.01)
*H02K 33/18* (2006.01)

(52) U.S. Cl.
CPC ......... *A61C 17/3481* (2013.01); *H02K 33/02* (2013.01); *H02K 33/18* (2013.01)

(58) Field of Classification Search
CPC .... H02K 33/18; H02K 33/02; A61C 17/3418; A61C 17/3445; A61C 17/3481
USPC ................................................ 15/22.1, 21.1
See application file for complete search history.

(56) References Cited

U.S. PATENT DOCUMENTS

| | | | |
|---|---|---|---|
| 5,613,259 A | 3/1997 | Craft et al. | |
| 6,997,446 B2 | 2/2006 | Hall et al. | |
| 7,067,945 B2 | 6/2006 | Grez et al. | |
| 7,288,863 B2 | 10/2007 | Kraus | |
| 7,687,944 B2 | 3/2010 | Benning et al. | |
| 7,730,569 B2 | 6/2010 | Grez et al. | |
| 7,852,182 B2 | 12/2010 | Willhelmus et al. | |
| 8,264,105 B2 | 9/2012 | Bax | |
| 8,304,938 B2 | 11/2012 | Jungnickel et al. | |
| 8,418,302 B1 * | 4/2013 | Suen ................. | A61C 17/3418 310/36 |
| 8,587,162 B2 | 11/2013 | Kagami et al. | |
| 8,595,882 B2 | 12/2013 | Bax et al. | |

(Continued)

FOREIGN PATENT DOCUMENTS

| | | |
|---|---|---|
| CN | 104578668 | 4/2015 |
| CN | 106109040 | 11/2016 |

(Continued)

*Primary Examiner* — Katina N. Henson
(74) *Attorney, Agent, or Firm* — Dorsey & Whitney LLP

(57) ABSTRACT

The present disclosure relates generally to oral health products, such as electric toothbrushes. In one example, the electric toothbrush includes a housing, an output shaft positioned within and extending out of the housing, a magnetic assembly positioned within the housing and configured to impart an oscillation motion to the output shaft, and a spring positioned within the housing. The spring includes a first end non-rotatably coupled to the housing and a second end non-rotatably coupled to the output shaft, such that the spring twists as the magnetic assembly oscillates the output shaft to amplify the oscillation motion of the output shaft generated by the magnetic assembly.

20 Claims, 10 Drawing Sheets

(56) References Cited

U.S. PATENT DOCUMENTS

| | | |
|---|---|---|
| 8,816,557 B2 | 8/2014 | Long et al. |
| 8,943,635 B2 | 2/2015 | Heil et al. |
| 8,970,072 B2 | 3/2015 | Headstrom |
| 8,970,141 B2 | 3/2015 | Bax et al. |
| 9,072,576 B2 | 7/2015 | Nishiura |
| 9,099,939 B2 | 8/2015 | Jungnickel et al. |
| 9,301,822 B2 | 4/2016 | Grez et al. |
| 9,410,593 B2 | 8/2016 | Kloster et al. |
| 9,743,750 B2 | 8/2017 | Boyke et al. |
| 9,806,591 B2 | 10/2017 | Schober et al. |
| 2004/0119344 A1 | 6/2004 | Lau et al. |
| 2007/0011834 A1* | 1/2007 | Shimizu ............. A61C 17/3418 15/22.1 |
| 2008/0185922 A1* | 8/2008 | Kressner ................ H02K 33/02 310/36 |
| 2014/0259473 A1 | 9/2014 | Bax et al. |
| 2017/0271935 A1 | 9/2017 | Luo et al. |
| 2017/0273768 A1 | 9/2017 | Bax et al. |
| 2018/0145576 A1 | 5/2018 | Kraus |
| 2019/0140533 A1 | 5/2019 | Hu et al. |
| 2019/0269488 A1* | 9/2019 | Boere ................ A61C 17/0202 |

FOREIGN PATENT DOCUMENTS

| | | |
|---|---|---|
| CN | 108667255 | 10/2018 |
| WO | 2017008038 | 1/2017 |
| WO | 2017220355 | 12/2017 |
| WO | 2018046429 | 3/2018 |
| WO | 2018046760 | 3/2018 |
| WO | 201878848 | 5/2018 |

* cited by examiner

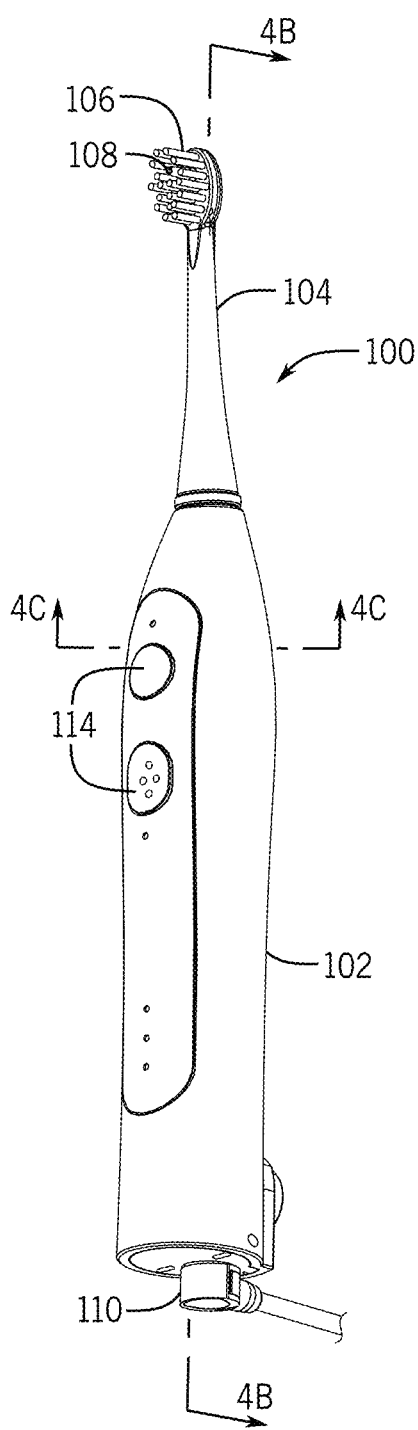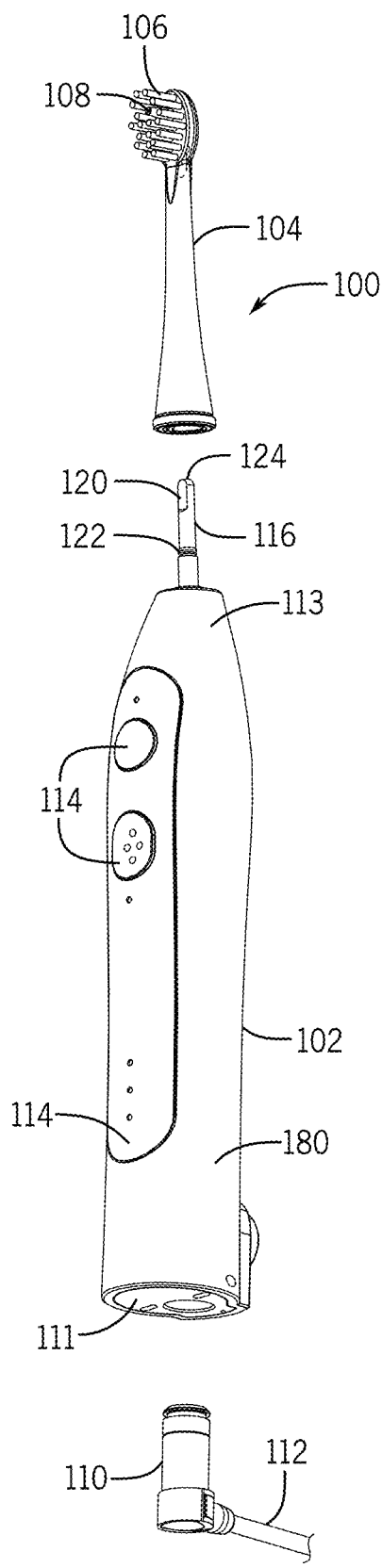
FIG. 1A
FIG. 1B

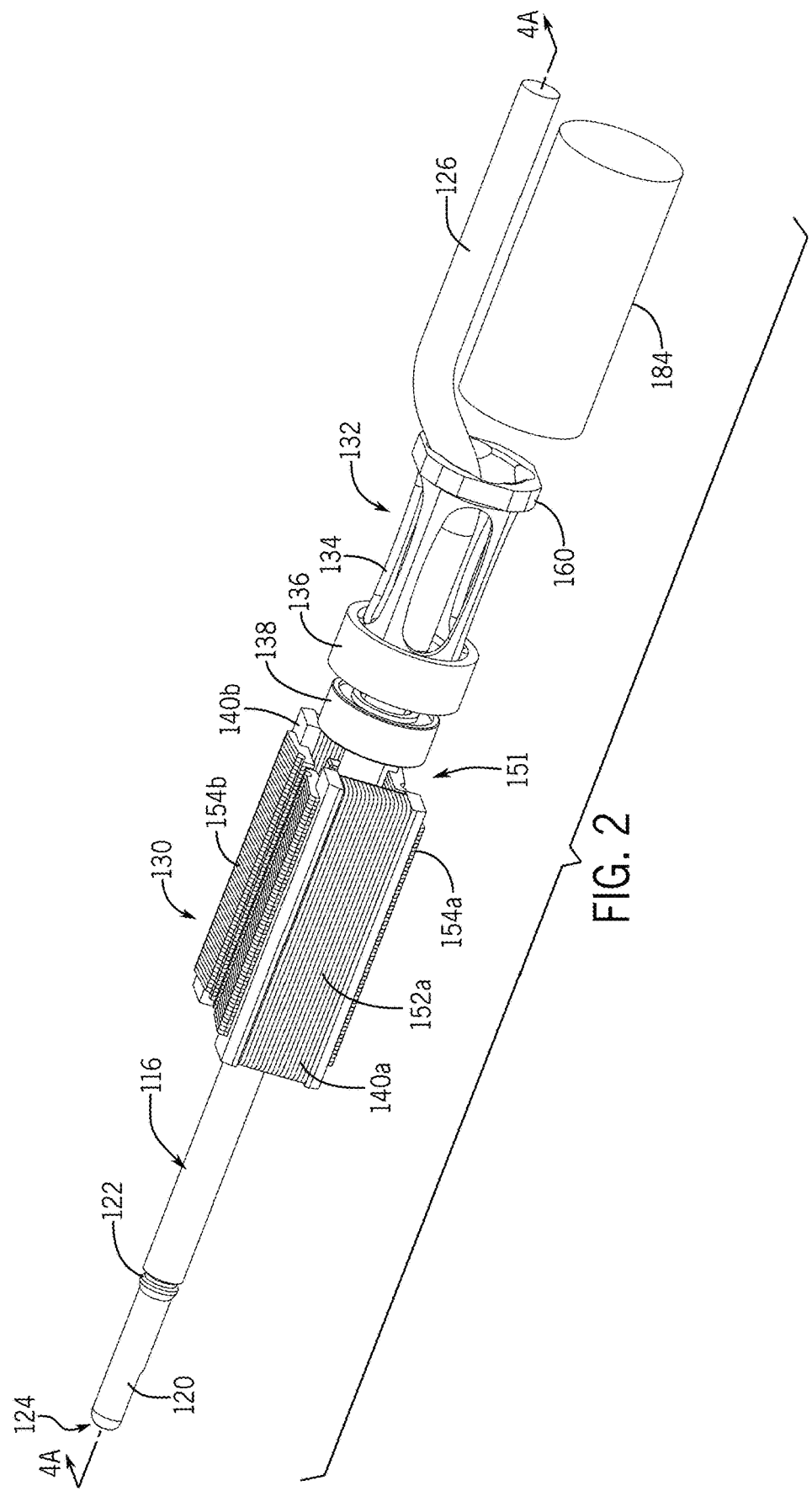

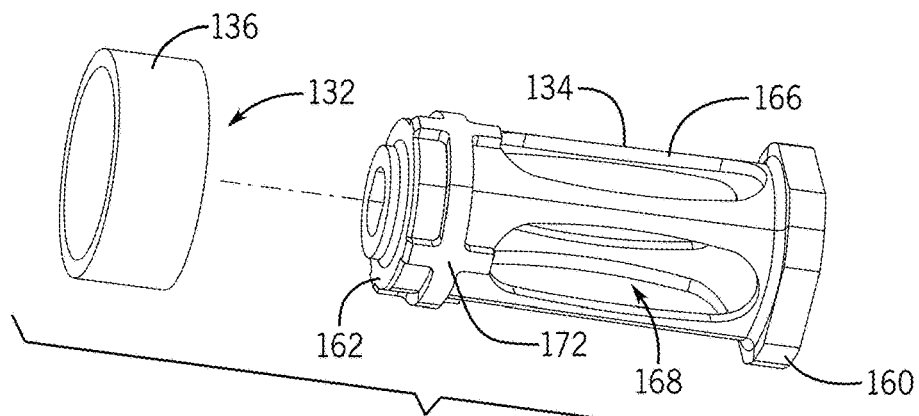
FIG. 6A
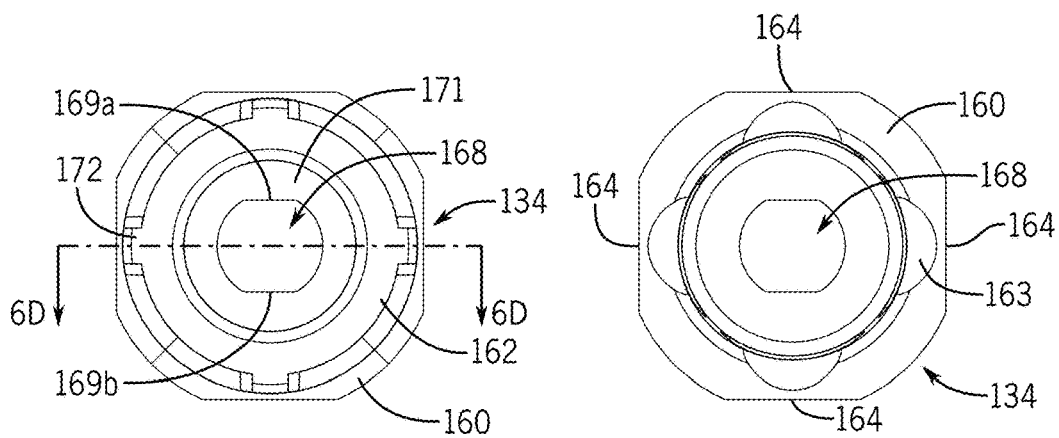
FIG. 6B
FIG. 6C
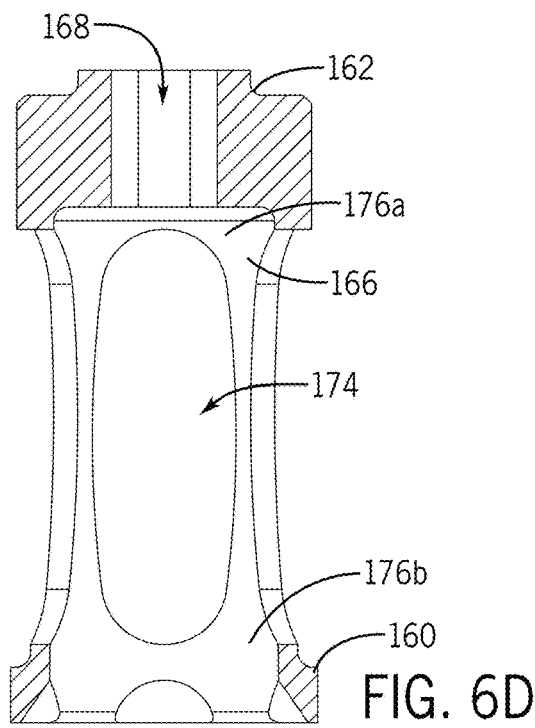
FIG. 6D

ELECTRIC TOOTHBRUSH

CROSS-REFERENCE TO RELATED APPLICATIONS

The present application claims priority to U.S. Provisional Application No. 62/908,415, filed Sep. 30, 2019, entitled "Electric Toothbrush," which is hereby incorporated herein in its entirety for all purposes.

FIELD

The present disclosure relates to oral health products. More specifically, the present disclosure relates to electric toothbrushes.

BACKGROUND

Oral health is important to many people, and often people will use an electrically-driven toothbrush to achieve a desired cleaning effect. Additionally, some people use an oral irrigator or flosser in combination with or separate from brushing. Devices that include both irrigating and brushing functionality generally include mechanical drive trains that can be noisy and induce unwanted vibrations within the toothbrush handle.

The information included in this Background section of the specification, including any references cited herein and any description or discussion thereof, is included for technical reference purposes only and is not to be regarded subject matter by which the scope of the invention as defined in the claims is to be bound.

SUMMARY

In one embodiment an electric toothbrush is disclosed. The electric toothbrush includes a housing, an output shaft positioned within and extending out of the housing, a magnetic assembly positioned within the housing and configured to impart an oscillation motion to the output shaft, and a spring positioned within the housing. The spring includes a first end non-rotatably coupled to the housing and a second end non-rotatably coupled to the output shaft, such that the spring twists as the magnetic assembly oscillates the output shaft to amplify the oscillation motion of the output shaft generated by the magnetic assembly.

In another embodiment, the electric toothbrush includes a handle housing; a hollow output shaft having an inlet end and an outlet end, the inlet end positioned within the housing and the outlet end extending out of the housing and connectable to a brush head; first and second permanent magnets positioned within the housing and fixed to opposing sides of the output shaft so as to rotate therewith; first and second electromagnets fixed in position relative to the housing and positioned on opposing sides of the output shaft; a spring including a first end non-rotatably connected to the housing, a second end non-rotatably connected to the inlet end of the output shaft, and a plurality of beams extending from the first end of the spring to the second end of the spring; a mass non-rotatably connected to the second end of the spring and formed from a different material than the spring; and a fluid tube routed through the first end of the spring and coupled to the inlet end of the output shaft within the spring to deliver fluid to the brush head.

In another embodiment, an activation method for an electromagnetically driven toothbrush is disclosed. The method includes activating a first stationary electromagnet, positioned adjacent a first side of an output shaft and having a first winding direction, and a second stationary electromagnet, positioned adjacent a second side of the output shaft and having a second winding direction opposite the first winding direction, with a first signal to rotate the output shaft in a first direction; and activating the first stationary electromagnet and the second stationary electromagnet with a second signal to rotate the output shaft in a second direction opposite the first direction.

BRIEF DESCRIPTION OF THE DRAWINGS

FIG. 1A is an isometric view of an electric toothbrush with a fluid connector coupled thereto.

FIG. 1B is a partially exploded view of the toothbrush of FIG. 1A.

FIG. 2 is an isometric view of a drive train and a battery for the toothbrush of FIG. 1A.

FIG. 6A is an exploded view of a spring and a mass for the drive train of FIG. 2.

FIG. 6B is a top plan view of the spring of FIG. 6A.

FIG. 6C is a bottom plan view of the spring of FIG. 6A.

FIG. 6D is a cross-section view of the spring taken along line 6D-6D in FIG. 6B.

DETAILED DESCRIPTION

Figure 3:
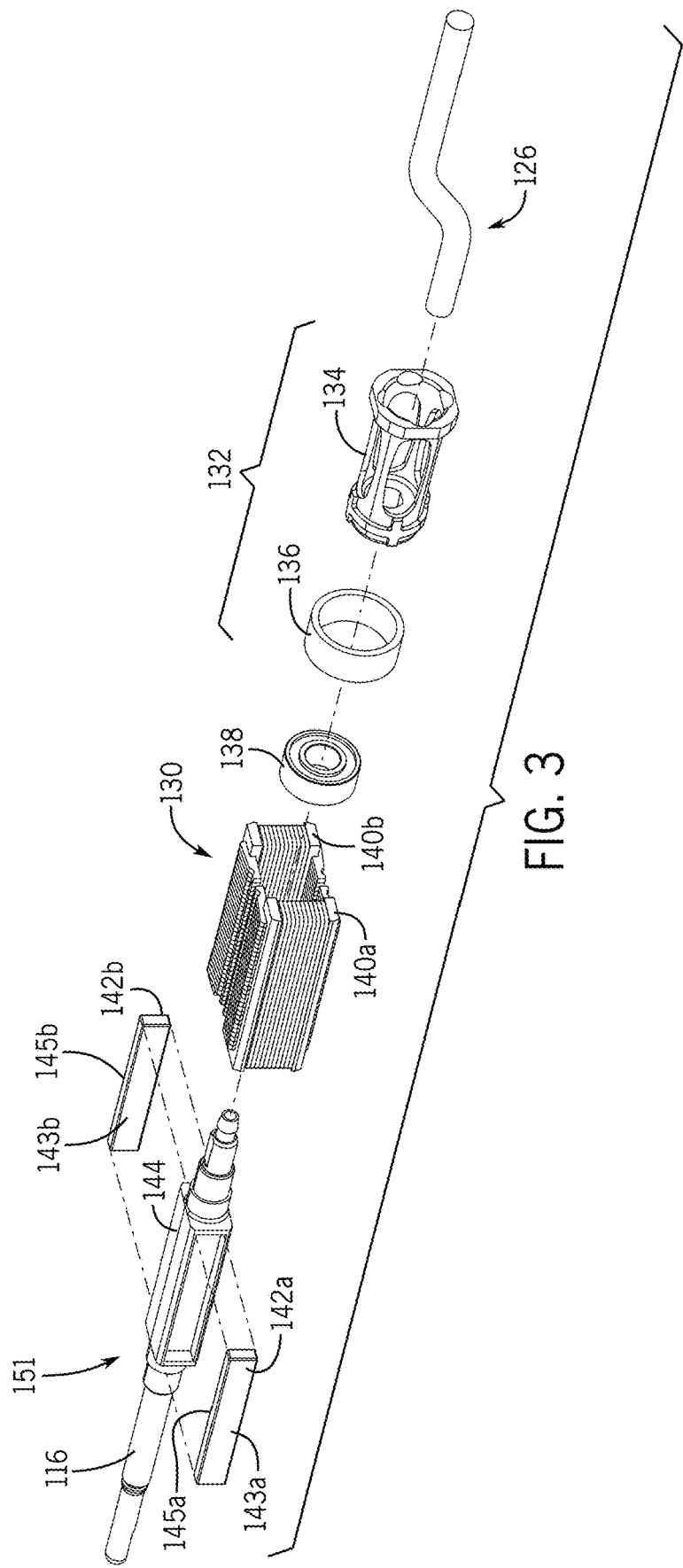
FIG. 3 is an exploded view of the drive train of FIG. 2.

The present disclosure relates generally to an oral cleansing device, such as an electric toothbrush, which may include irrigating and brushing features. The electric toothbrush may provide a flow path for fluid, such as water or mouthwash or the like, to allow a user to brush and/or irrigate his or her teeth. The electric toothbrush may include an electromagnetic drive train. The electromagnetic drive train may provide a powerful, large oscillating angular range, while being quieter than conventional mechanical drive trains. The electromagnetic drive train may define a fluid path therethrough for delivering fluid to the brush head or other working implement attached to the electric toothbrush.

The drive train may include an output shaft that functions as a rotor or driven shaft. The drive train may include a magnetic assembly. For example, the output shaft may include one or more magnetic elements, such as permanent magnets attached to opposing sides of the shaft. In one example, the magnetic elements are attached to a magnet housing that is coupled with the shaft, such as via an overmolding process, or otherwise connected to the shaft to rotate therewith. Electromagnetic elements, such as electromagnetic coils, may be positioned on adjacent sides of the output shaft near the magnetic elements. For example, the electromagnetic coils may be fixed to a chassis or housing surrounding a magnetic portion, such as the permanent magnets, of the output shaft. As the electromagnetic coils are activated, the permanent magnets are driven by the resulting magnetic field, rotating the output shaft. In some embodiments, the output shaft is hollow and also functions as a fluid tube to transport fluid through the drive train.

The drive train may include a spring that enhances the rotating or oscillating motion of the output shaft generated by the magnetic assembly, such as the electromagnetic coils and the permanent magnets. The spring may include two or more beams that extend along a longitudinal length of the spring. The beams may be tapered or arcuate shaped. A first end of each beam may be located at a first end of the spring, and a second end of each beam may be located at a second end of the spring. The first ends of the beams may be connected together at the first end of the spring, and the second ends of the beams may be connected together at the second end of the spring. The spring may be hollow, with the beams forming an outer perimeter of the spring, to allow a tube or other fluid pathway to extend through the spring. The shape and configuration of the spring is configured to amplify the motion of the output shaft generated by the magnetic forces, while accommodating a flow path through an interior of the spring to the output shaft, thereby reducing the overall width or diameter of the drive train.

A mass may be coupled to the spring and may be configured such that the combination of the mass and spring have a natural frequency that matches an operational oscillation frequency of the output shaft, such that during operation of the electric toothbrush the spring and the mass contribute to (e.g., amplify) the oscillation of the output shaft. The mass may be formed of a different material (e.g., a denser/heavier material) than the spring to provide the proper mass and spring rate for matching the oscillating frequency of the drive train, while reducing the amount of space required for the mass and spring. In some embodiments, the mass is metal, and the spring is plastic. The mass may be integrated or otherwise attached to an end of the spring. In some embodiments, the mass is attached to an upper end of the spring and is positioned between the beams and the magnetic portion of the output shaft. The mass may be formed as a collar or sleeve that mounts onto an end of the spring. The mass and the spring may be configured to define a flow pathway therethrough to accommodate fluid flow through the electromagnetic drive train.

In operation, the electromagnetic coils may be driven by the same electrical drive signal. For example, the electromagnetic coils may be driven by the same alternating current. The electromagnetic coils may be electrically coupled together and wound in opposite directions, such that the electromagnetic coils generate opposite flux path directions relative to each other when the drive signal is applied to the electromagnetic coils. In other words, a first electromagnet wound in a first direction has a first flux direction and a second electromagnet wound in a second direction has a second flux direction different from the first flux direction, such that the same drive signal (e.g., alternating current) applied to the first and second electromagnets generates complementary electromagnetic forces that drive the output shaft in a first rotational direction. When the direction of the drive signal is reversed (e.g., the alternating current changes from positive to negative, or vice versa), the first and second electromagnets switch flux directions (i.e., the first electromagnet has the second flux direction the second electromagnet has the first flux direction) and generate complementary electromagnetic forces that drive the output shaft in a second rotational direction opposite the first rotational direction. The magnetic forces move the permanent magnets in opposite rotational directions, oscillating the output shaft back and forth about its longitudinal axis. Additionally, the spring assists the electromagnetic forces to rotate the output shaft. A first end of the spring may be rotationally fixed to the housing (e.g., via a chassis) and a second end of the spring may be rotationally fixed to the output shaft, such that the spring twists and applies kinetic energy to the output shaft as the output shaft is rotated in the first direction and the second direction by the magnetic assembly. A natural frequency of the spring and the mass may coincide with the oscillation frequency of the output shaft to amplify the amount of spring torque applied to the output shaft when the electromagnetic coils are driving the output shaft at the desired oscillation frequency.

The electric toothbrush may be fluidly connected to a reservoir, and a base station or unit with a fluid pump may pump water from the reservoir to the output shaft. The fluid from the reservoir may travel from the reservoir, through the handle via a flow pathway defined through the drive train, and exit the output shaft. By actuating the pump, which may be via a button on the electric toothbrush and/or the base unit, the user can irrigate his or her teeth.

It should be noted that the features described herein may be applied to irrigating devices, brushing devices, or combination irrigation and brushing devices. As such, the discussion of any particular "electric toothbrush" or "irrigating toothbrush" or "toothbrush" is meant as illustrative only.

Turning now to the figures, an illustrative electric toothbrush will now be discussed in more detail. FIG. 1A illustrates an isometric view of an electric toothbrush. FIG. 1B illustrates an isometric view of the electric toothbrush with a fluid connector and a brush head separated from the handle. With reference to FIGS. 1A and 1B, the electric toothbrush 100 may be in the form of an irrigating toothbrush and include a handle 102 with a brush head 104 and a fluid connector 110 removably connected thereto. The removability of the brush head 104 allows a user to replace the brush head 104 as desired and allows multiple users to hygienically use the same electric toothbrush 100. The brush head 104 includes a plurality of bristles 106, and in embodiments in which the electric toothbrush 100 includes an irrigating mode, a nozzle 108 may be connected to the brush head 104 and embedded within the bristles 106. In other embodiments, the nozzle 108 may be included in a separate nozzle specific tip that may not include bristles or may be positioned within or around the bristles as desired.

The electric toothbrush 100 may include one or more control buttons 114 that selectively activate and deactivate the various functions and/or modes of the toothbrush 100. The control buttons 114 may be connected to the handle 102 or any other convenient location for the user. The control buttons 114 may control the brushing functions of the toothbrush 100, such as activating the oscillation of the brush head 104, as well as control irrigating functions such as the water pressure and pulse length for irrigating toothbrushes, by communicating with a base unit. The number and function control of the control buttons 114 may be varied based on the desired functionality of the system. In some embodiments, the control buttons 114 may control components on the handle 102, but in other embodiments, the control buttons 114 may control components at another unit, such as a pump positioned within a base station.

The handle 102 may include a housing 180 that extends between a base end 111 and a brush end 113. The housing 180 may be generally cylindrical in shape to ergonomically fit in the hand of a user, but it may be formed in any other desirable ergonomic shapes. The cylindrical shape may taper in the direction of the brush end 113 approximately one third the length of the housing 180 from the brush end 113. A face plate 115 may be supported on the housing 180 in a region extending about the control buttons 114 as either a separate plate or as an overmolded surface on the housing 180. Example modes may include low speed, high speed, or water flosser mode. Example status indications may include low battery, charging, and fully charged battery.

With continued reference to FIGS. 1A and 1B, the electric toothbrush 100 may include an irrigating function and may be referred to as an irrigating toothbrush. In these embodiments, the toothbrush 100 includes a fluid connector 110 for connecting the handle 102 to a fluid source. Typically, the fluid connector 110 includes a hose 112 that is in fluid communication with a reservoir and/or pumping system for pumping fluid through the hose 112 to the nozzle 108. For example, the fluid connector hose 112 may be connected to a base station including a pump and reservoir, where the base unit pump pumps fluid from the reservoir through the hose 112 to the nozzle 108. An example of a pumping system that may be fluidly connected to the hose 112 is shown in U.S. Pat. No. 8,641,649 entitled "Pump for Dental Water Jet," filed on Jun. 25, 2010. However, in other embodiments, the hose 112 may be connected directly to a pressurized water source, such as a faucet or J-pipe. The fluid connector 110 is removable from the handle 102 to allow the device 100 to be used without a fluid source, e.g., in brush only mode, and allow easier storage and traveling. Additionally, the fluid connector 110 may be configured to rotate relative to the handle 102.

The electric toothbrush 100 includes an output shaft 116 that is movable and connectable to a working implement or tip, such as the brush head 104. As shown in FIG. 1B, in one example, the output shaft 116 includes a keyed surface 120 that couples the brush head 104 to the output shaft such that the brush head 104 rotates with the output shaft 116, allowing the output shaft 116 to oscillate the brush head 104. Additionally, a clip groove 122 may be defined on an exposed portion of the output shaft 116 and may receive a clip or other retaining mechanism associated with the brush head 104 to further releasably secure the brush head 104 to the output shaft 116. To provide fluid to the nozzle 108, the output shaft 116 may be hollow and include a shaft outlet 124 defined on a top end, e.g., as an open end or an outlet aperture defined in an upper surface of the output shaft 116. Features of the output shaft 116 will be discussed in more detail below, but in some instances the output shaft 116 functions as a dual-purpose member, to both deliver fluid to the nozzle 108 and transfer motion from a drive assembly to the brush head 104. In this manner, the output shaft 116 may act as a driven shaft, a rotor, or the like. However, in instances where the electric toothbrush is not an irrigating toothbrush, the output shaft may not include a fluid feature (e.g., the output shaft may be solid).

Figure 4A:
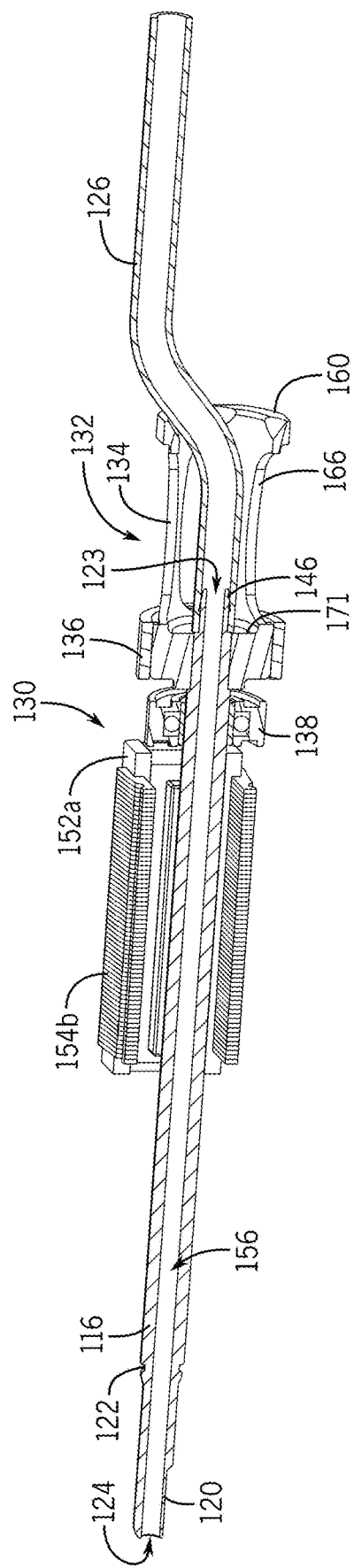
FIG. 4A is a cross-section of the drive train taken along line 4A-4A in FIG. 2.
Figure 4B:
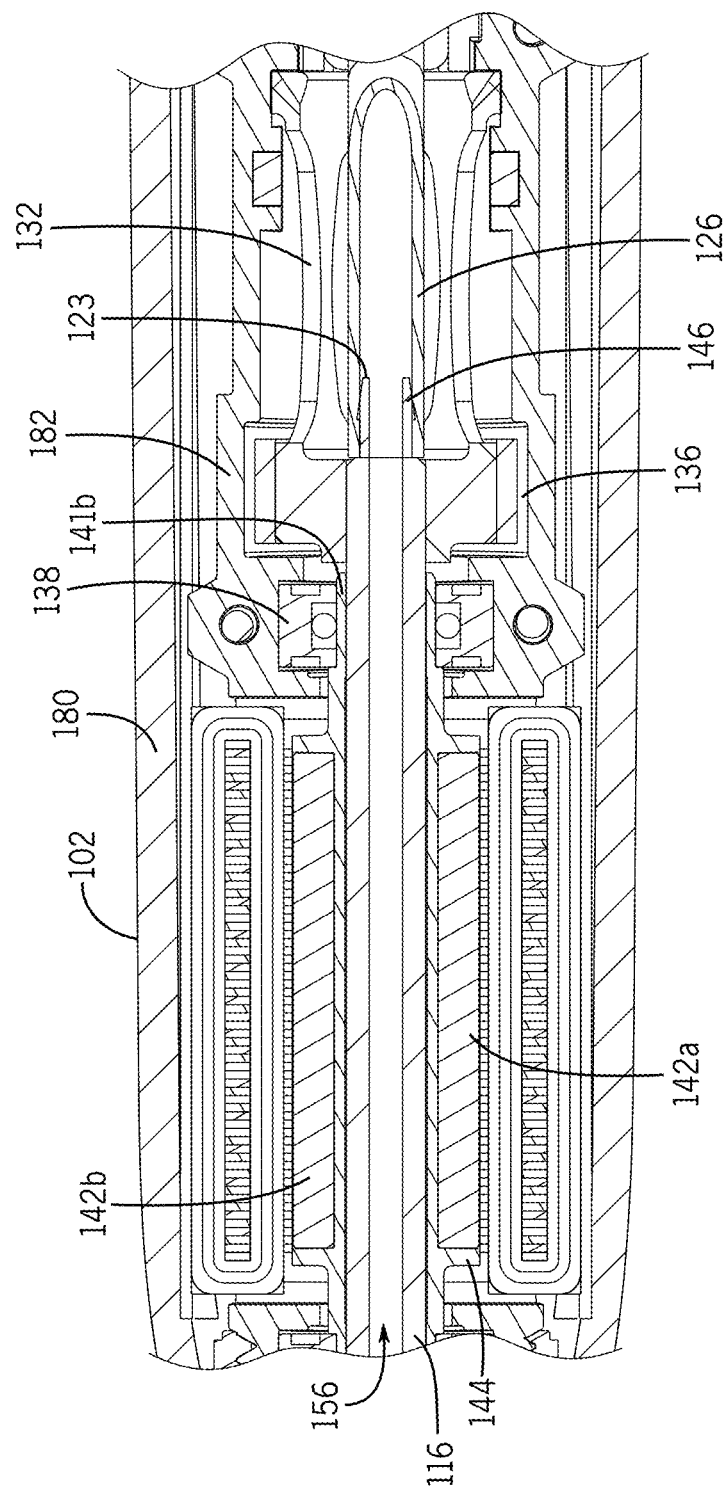
FIG. 4B is a cross-section of the toothbrush taken along line 4B-4B in FIG. 1A.
Figure 4C:
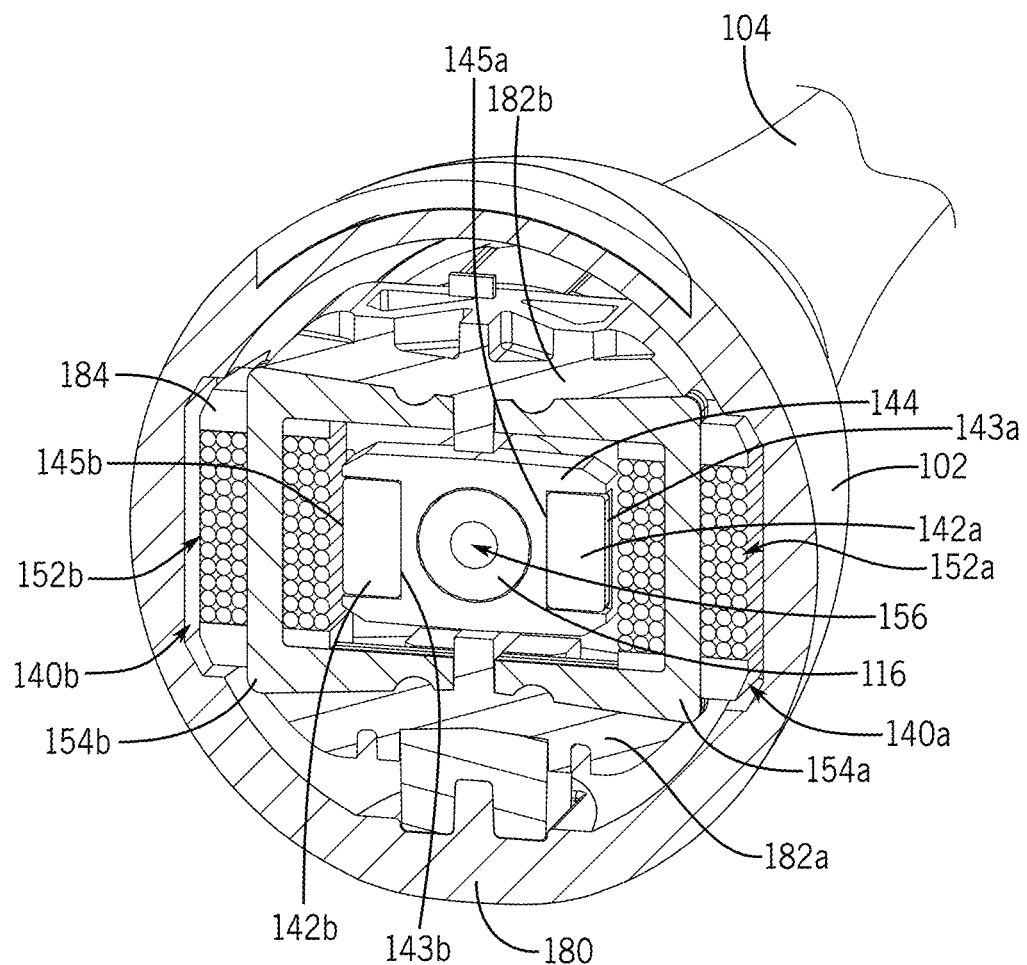
FIG. 4C is a cross-section of the toothbrush taken along line 4C-4C in FIG. 1A.

The electric toothbrush 100 includes a drive train or power train that generates motion for the output shaft 116 and the brush head 104. FIG. 2 is an isometric view of a drive assembly or drive train 130 and a battery 184 for the electric toothbrush 100. FIG. 3 is an exploded view of the drive train 130. FIGS. 4A-4C illustrate various cross-sections of the drive train. With reference to FIGS. 2 and 3, the drive train 130 includes the output shaft 116, a spring 134, and a magnetic assembly 151, which may be received at least partially within the handle housing 180. The drive train 130 may include a bearing 138. The bearing 138 may reduce friction of the output shaft 116 during rotation, while also helping to ensure that the output shaft 116 remains in alignment during rotation. In one example, the bearing 138 is a ball bearing and includes a plurality of balls captured within a race. However, the bearing 138 may be omitted or may be varied as needed, e.g., other friction reducing components may be used.

The magnetic assembly 151 may include one or more permanent magnets 142a, 142b and one or more electromagnets 140a, 140b. The permanent magnets 142a, 142b may be any type of magnetic material that retains a magnetic field in the absence of an inducing field or current. The permanent magnets 142a, 142b may be generally any configuration, but in the example shown in FIG. 3, the magnets 142a, 142b are rectangular shaped members. In one embodiment, a first face 143a, 143b of the magnets 142a, 142b has a first magnetic force direction (e.g., north pole), and a second face 145a, 145b of the magnets 142a, 142b has a second magnetic force direction (e.g., south pole). In this embodiment, the north and south poles of the magnets 142a, 142b may be defined on the major surfaces 143a, 143b, 145a, 145b of the magnets 142a, 142b, such as along the longitudinal faces, versus at a top or bottom end or other vertical orientation. In this manner, the magnets 142a, 142b may have a large surface area exposed for interaction with the electromagnets 140a, 140b, which can increase the power or motion of the drive train 130.

The electromagnets 140a, 140b are components that develop a magnetic field in response to a current. In one example, the electromagnets 140a, 140b include a conductive wiring wrapped into a winding 152a, 152b around a core 154a, 154b. In one example, the cores 154a, 154b are a magnetic material to increase the magnetic flux of the generated magnetic field when electricity is conducted through the windings 152a, 152b. For example, the cores 154a, 154b may be iron, or another ferromagnetic material. The cores 154a, 154b may define brackets and include top and bottom extensions that are connected by a perpendicular member. In this manner, the top and bottom extensions bracket the windings 152a, 152b that wrap around the perpendicular member. In one example, the cores 154a, 154b are formed of a plurality of iron sections that are coupled together.

In one embodiment, the first electromagnet 140a has a first winding direction WD1 (see FIG. 7A) for the first winding 152a and the second electromagnet 140b has a second winding direction WD2 (see FIG. 7A) for the second winding 152b that is opposite the first winding direction WD1, i.e., the current flows in opposite directions in the two windings. The first winding 152a and the second winding 152b may be connected together (e.g., via a trace on a circuit board), such that the opposite winding configuration allows the electromagnets 140a, 140b to be driven by the same signal, but generate opposite magnetic forces relative to each other.

Figure 5:
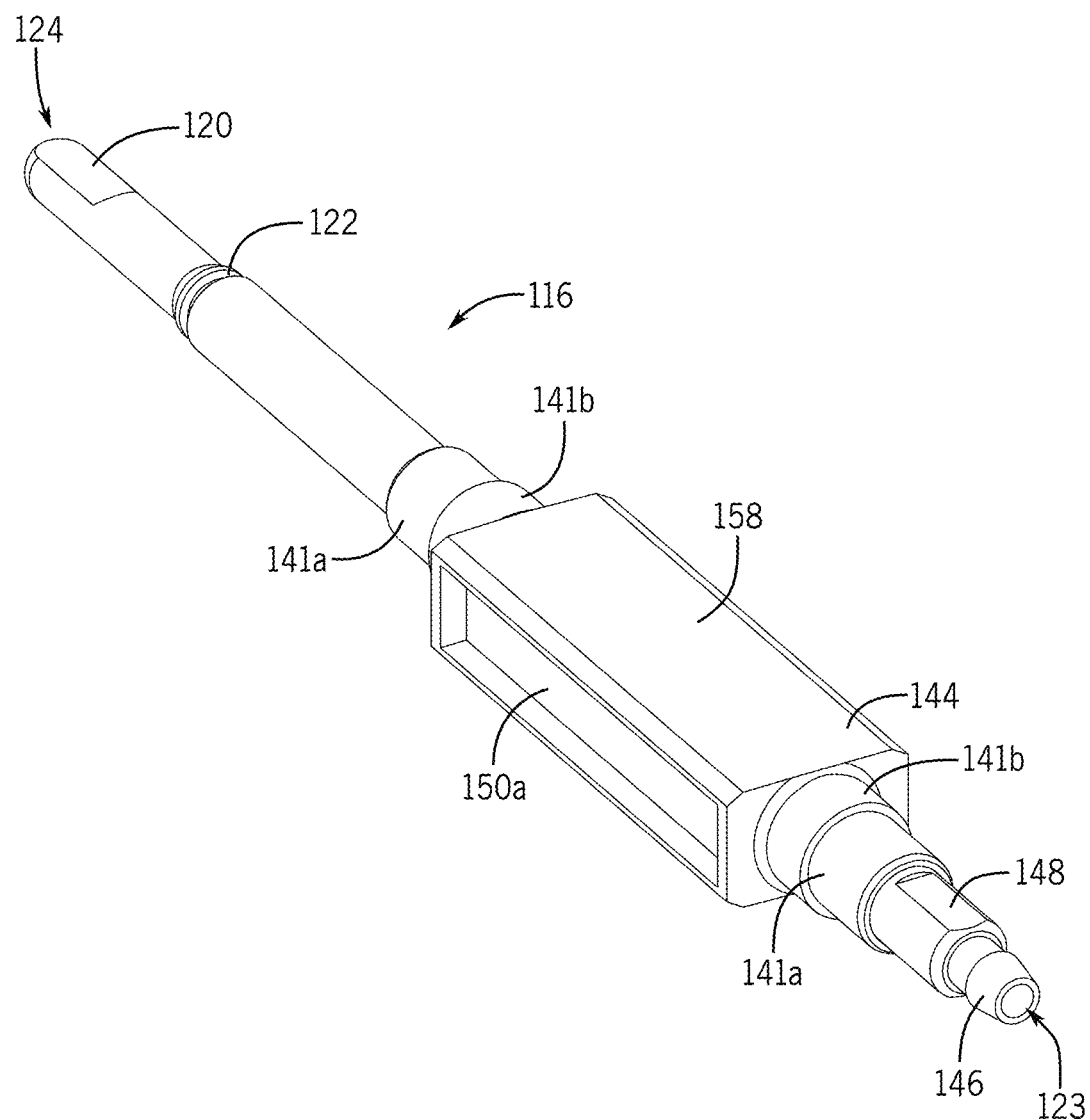
FIG. 5 is a top isometric view of an output shaft for the drive train of FIG. 2.

With reference to FIGS. 2, 4A, and 5, the output shaft 116 may be configured to provide an irrigating feature. In these embodiments, the output shaft 116 is defined as a generally elongated tube having a first end terminating at an open end defining the shaft outlet 124 and a second end terminating at a shaft inlet 123. The output shaft 116 may be rectilinear. The output shaft 116 may include a nipple 146 or other connector, such as a barbed end or the like, that surrounds and in part defines the shaft inlet 123. The nipple 146 may be coaxially aligned with a longitudinal centerline of the output shaft 116. The nipple 146 acts to secure a fluid tube 126 to the output shaft 116. The second end of the output shaft 116 may include or define a keyed surface 148, such as a flat surface or spline, which keys the output shaft to a drive element, such as the spring 134, to allow motion transfer therebetween. In one example, the output shaft 116 may include two keyed surfaces 148, one on each side of the output shaft 116, i.e., on opposing lateral sides. In some embodiments, the output shaft 116 is hollow or otherwise configured to define a flow lumen 156 or flow path therethrough.

The permanent magnets 142a, 142b may be attached to the output shaft 116 such that the permanent magnets 142a, 142b rotate in unison with the output shaft 116. As illustrated in FIG. 5, the output shaft 116 may include a magnet housing 144 positioned between the shaft outlet 124 and the shaft inlet 123. The magnet housing 144 may be formed integrally with a main body of the outlet shaft 116, such as by a plastic injection forming process. In other instances, the magnet housing 144 may be secured to the main body, such as via adhesive or an overmolding, ultrasonic welding, or other securing process.

The magnet housing 144 may define one or more pockets 150a, 150b configured to receive magnetic elements, such as permanent magnets 142a, 142b. As illustrated in FIG. 5, the pockets 150a, 150b may be formed on opposing lateral sides of the magnet housing 144, e.g., on diametrically opposing sides of the output shaft 116. The opposing lateral placement of the magnet pockets 150a, 150b may assist in providing the desired oscillation of the output shaft 116 when the drive train 130 is actuated. The length of the pockets 150a, 150b may extend longitudinally along a longitudinal length of the output shaft 116, and thus thinner, longer magnets may be used to reduce the overall thickness of the drive train 130 and accordingly the handle 102. The shape and configuration of the magnet housing 144 may be varied as desired (e.g., to accommodate different numbers and shapes of magnets used with the drive train 130). The flow lumen 156 may be defined between the pockets 150a, 150b. The flow lumen 156 may extend along a longitudinal centerline of the handle 102.

With continued reference to FIG. 5, the magnet housing 144 may include sleeve sections 141a located at opposite ends of the magnet housing 144. The sleeve sections 141a may define a cylindrical outer surface that functions as a bearing surface for one or more bearings, such as bearing 138. The magnet housing 144 may include sleeve sections 141b located between the main body 158 of the magnet housing 144 and the sleeve sections 141a to define a shoulder or stop for the one or more bearings mounted on the sleeve sections 141a. In some embodiments, the sleeve sections 141a, 141b may be omitted and the one or more bearings may be mounted directly onto the output shaft 116.

FIG. 6A illustrates an exploded view of a rotation assistance system 132. The rotation assistance system 132 may include a spring 134 and a mass 136. The spring 134 and the mass 136 are configured to have a natural or resonant frequency that matches the drive or oscillation frequency of the output shaft 116. In one example, the mass 136 is formed as a cylindrical band that fits around a top end of the spring 134. The mass 136 may be non-rotatably coupled to the top end of the spring 134 such that the mass 136 rotates with the top end of the spring 134 about a longitudinal axis of the spring 134. The mass 136 may be configured in other manners, such as a weighted sidewall, a ball mass, or the like.

The mass 136 is configured to add additional weight to one end of the spring 134. The mass 136 may be formed of a different material than the spring 134. For example, the mass 136 may be formed of a heavier material than the spring 134. In some examples, the mass 136 may be metal, such as steel, aluminum, metal alloys, or the like, and the spring 134 may be plastic.

The spring 134 is configured to allow a fluid pathway to be defined therethrough, such as by accommodating a fluid tube therethrough, as well as to twist under force and resiliently return to its original configuration. Referring to FIGS. 6A-6D, the spring 134 may be hollow and define a longitudinal cavity 168 therein. The spring 134 may include a first end 160 and a second end 162, and the longitudinal cavity 168 may extend through the first end 160 and the second end 162 of the spring 134 to accommodate the passage of fluid through the entire length of the spring 134. In operation, the spring 134 may be driven by the magnetic assembly 151 to the intended oscillation frequency of the output shaft 116. When the spring 134 is twisted away from its original configuration, the spring 134 generally resists the twisting motion. However, when the direction of twisting is reversed toward the original configuration of the spring 134, the spring 134 contributes to the twisting motion. To amplify the motion of the output shaft 116, the natural frequency of the spring 134 and the mass 136 may be configured to match the desired oscillation frequency of the output shaft 116.

One end of the spring 134 may be non-rotatably coupled to the housing (e.g., via a chassis). For example, with reference to FIG. 6C, the first end 160 of the spring 134 may be shaped to frictionally fit or otherwise be rotationally fixed in position relative to a housing or chassis. The first end 160 may be formed as one or more keyed surfaces 164, such as flat surfaces, that are interconnected by arcuate or slightly curved edges. Other keying structures, such as a grooves, tabs, or the like may be used as well. The first end 160 may be defined as a ring and may define a flow path aperture therethrough (e.g., the longitudinal cavity 168). One or more tube seats 163 may be formed on the first end 160. For example, as shown in FIG. 6C, one or more curved recessed seats 163 may be defined on the bottom surface of the first end 160 and extend upwards along the interior surface of the spring 134. The tube seats 163 may facilitate placement of a fluid tube within the first end 160 of the spring 134.

The other end of the spring 134 may be non-rotatably coupled to the output shaft 116. For example, with reference to FIG. 6B, the second end 162 of the spring 134 may include engagement or keying surfaces 169a, 169b for engagement with the keyed surfaces 148 of the output shaft 116 to transfer rotational movement of the output shaft 116 to the second end 162 of the spring 134, and vice versa. The engagement surfaces 169a, 169b may be defined in an interior wall or shelf 171 (see FIGS. 4A and 6B) of the second end 162 of the spring 134, and may be defined as flats or otherwise non-circular geometry for engagement with the keyed surface 148 of the output shaft 116. The interior wall 171 of the second end 162 of the spring 134 may function as a seat for a lower end of the output shaft 116, and the nipple 146 may be positioned beneath the interior wall 171 for connection to the fluid tube 126 within the interior of the spring 134.

Referring to FIGS. 2, 3, and 6A, the mass 136 may be coupled to the second end 162 of the spring 134. For example, the mass 136 may be friction or interference fit to the second end 162 of the spring 134. The second end 162 of the spring 134 may be defined as a ring and include one more spacing or connection ribs 172 extending outwards along an outer surface thereof. In one example, the second end 162 of the spring 134 may include multiple connection ribs 172 spaced apart from one another along the outer surface of the second end 162 of the spring 134. The connection ribs 172 may extend lengthwise in a length direction of the spring 134. The connection ribs 172 may be coupled together by a raised arcuate section extending around the outer surface of the second end 162 of the spring 134. The connection ribs 172 may provide a friction or interference fit with the mass 136 to retain the mass 136 onto the second end 162 of the spring 134. A top surface of the second end 162 of the spring 134 may define an aperture therethrough (e.g., the longitudinal cavity 168). The longitudinal cavity 168 may be aligned with the central axis of the spring 134.

The spring 134 may include resilient members, such as beams 166, which extend between the first end 160 and the second end 162 of the spring 134. In one example, the spring 134 may include four beams 166, but the number and width of the beams may be varied depending on the desired spring constant for the spring 134. In some embodiments, the beams 166 include expanded base ends 176a, 176b at the first and second ends 160, 162 of the spring 134, and the beams 166 taper inwardly from the expanded base ends 176a, 176b toward a central portion of the beams 166. In other words, the width of the beams 166 may increase as the beams 166 extend from their respective center portions toward the ends 160, 162 of the spring 134 to define the expanded width of the base ends 176a, 176b. In this manner, the central portion of the beams 166 may be the thinnest section of the beams 166. The tapering of the beams 166 may define arched openings 174 between the arched or curved beams 166. The arched openings 174, as shown for example in FIG. 6D, may be defined as elliptically-shaped openings that define curved ends at the base ends 176a, 176b of the beams 166.

The tapered arcuate or arched shape of the beams 166 of the spring 134 provides for load distribution, allowing the spring portion 134 to be constructed out of less expensive and less durable materials, such as plastic, without significantly impacting the operational lifespan of the spring 132. Additionally, the beams 166 define a desired spring rate, which in combination with the mass 136, matches a desired drive frequency of the drive train 130. In some embodiments, other types of springs, such as leaf springs, coil springs, or the like may be used. The shape of the spring 134 and the beams 166 may be selected based on desired spring rates, as well as an aesthetic appearance.

In some embodiments, the spring 134 is made of a resilient and inexpensive material, such as plastic, which reduces the overall cost of the toothbrush 100. Conventional toothbrushes may include metal coil springs, but such springs may be more expensive to manufacture, increasing the cost of the toothbrush. The combination of the spring 134 and the mass 136 allows the spring 134 to be made of less expensive materials than conventional metal springs, while the mass 136 assists in matching a desired resonant frequency. It should be noted that in other examples, such as where manufacturing expenses are not an issue, the drive train 130 may include a metal coil spring or other metal formed spring component.

Assembly of the drive train 130 for the electric toothbrush 100 will now be discussed. With reference to FIGS. 2, 3, and 4A, the mass 136 may be connected to the spring 134. For example, in instances where the mass 136 is a band or ring, the mass 136 may be received around the second end 162 of the spring 134, such as in a press fit connection. The connection ribs 172 on the outer surface of the second end 162 may help to securely engage the mass 136 to the spring 134, as the ribs 172 may resiliently flex or deform to allow the mass 136 to be received over the end 162 of the spring 134, frictionally engaging the mass 136 to the spring 134. In other embodiments, the mass 136 may be integrated into the second end 162 of the spring 134, or the mass 136 may be coupled to the spring 134 in other manners, such as adhesive, welding, or the like.

With reference to FIG. 5, the permanent magnets 142a, 142b may be coupled to the output shaft 116. For example, the permanent magnets 142a, 142b may be positioned within the magnet pockets 150a, 150b defined by the magnet housing 144. The permanent magnets 142a, 142b may be secured within the pockets 150a, 150b via a press or friction fit and/or may include adhesive or other fastening elements.

In one example, the first magnet 142a is received within the first pocket 150a such that its first face 143a is positioned outward away from the interior surface of the magnet housing 144 and the second face 145a is positioned towards the interior surface of the magnet housing 144. In this example, the second magnet 142b may be received within the second pocket 150b such that its first face 143b is positioned inwards towards the interior surface of the pocket 150b of the magnet housing 144 and the second face 145b is facing outwards, away from the interior surface of the magnet housing 144. In this manner, the corresponding first pole faces 143a, 143b and corresponding second pole faces 145a, 145b for the permanent magnets 142a, 142b may be oriented in the same direction as one another. This orientation may assist in retaining the magnets 142a, 142b within the pockets 150a, 150b, since the interior facing surfaces of the magnets may be opposite poles and exert an attraction force towards one another. As a specific example, the orientation of the magnets may be N|S|N|S with the center line of the output shaft 116 defined between the magnets 142a, 142b.

The bearing 138 may be received around a lower end portion of the output shaft 116. In one example, the bearing 138 may be positioned around the bottom first sleeve 141a of the magnet housing 144, with the raised lip of the second sleeve portion 141b acting to help retain the bearing 138 in position. In this manner, the bearing 138 may be positioned on the output shaft 116 between the permanent magnets 142a, 142b of the magnet housing 144 and the nipple 146 defining the inlet of the output shaft 116.

With reference to FIG. 4A, the spring 132 may be received around the bottom end of the output shaft 116. The output shaft 116 may be aligned such that the two keyed surfaces 148 are aligned with the corresponding keyed surface walls 169a, 169b of the second end 162 of the spring 134. The engagement between the keyed surfaces 148 and the keyed surface walls 169a, 169b assists in connecting the rotation of the output shaft 116 to the second end 162 of the spring 134, and vice versa, such that motion of the output shaft 116 and the spring 134 is transferred to each other. The nipple 146 of the output shaft 116 may extend through the second end 162 of the spring 134 into the internal cavity 168 of the spring 134.

The fluid tube 126 may be received through the first end 160 of the spring 134 and routed through the internal cavity 168 to mate with the nipple 146 inside the spring 134. The fluid tube 126 may be pressed onto the nipple 146 to fluidly couple the output shaft 116 to the fluid tube 126. In these embodiments, the fluid tube 126 is received within the spring 134, and the spring 134 prohibits the tube 126 from engaging the chassis or other components of the housing 180. As the fluid tube 126 exits out of the first end 160 of the spring 134, the fluid tube 126 may be seated within one of the seats 163 formed in the first end 160 of the spring 134, and the fluid tube 126 may be routed alongside the battery 184 (see FIG. 2).

Portions of the drive train 130 may be received within a handle housing 180 and coupled either directly to the housing 180 or, as shown in FIG. 4B, connected via a chassis 182. The chassis 182 may be formed of a first portion 182a and a second portion 182b (see FIG. 4C) that are coupled together, e.g., via fasteners or the like. The chassis 182 provides structural support for various components within the handle 102. In one embodiment, the electromagnets 140a, 140b are received within magnet cavities, recesses, or other features within the chassis 182. The electromagnets 140a, 140b are fixed in position within the housing 180 and may be fixedly connected to the housing 180 and/or the chassis 182. In this manner, the electromagnets may form the "stator" or stationary portion of the electromagnetic drive train 130. While not shown, the electromagnets 140a, 140b are connected to a power source, such as battery 184 (see FIG. 2), and a control element (e.g., processor or signal generator) that provides current to the electromagnets to selectively generate a magnetic field. In some instances, the battery and control element may be coupled to the chassis 182 or at least received within the housing 180.

The output shaft 116, the fluid tube 126, the spring 134, and the bearing 138 may be positioned within the chassis 182. In one example, the output shaft 116 is positioned such that its top end extends out of the chassis 182 and the housing 180, and the magnet housing 144 is aligned with the electromagnets 140a, 140b within the chassis 182. The chassis 182 may define a shaft pocket or cavity that allows the output shaft 116 to rotate within and relative to the chassis 182. For example, the bearing 138 may be received in a recess that helps to maintain the longitudinal alignment of the output shaft 116 within the chassis 182, while allowing the output shaft 116 to rotate.

The spring 134 may be non-rotatably coupled to the chassis 182 on one end of the spring 134. For example, the first end 160 of the spring 134 may be secured to the chassis 182 to prevent the first end 160 of the spring 134 from rotating relative to the chassis 182. In this configuration, the second end 162 of the spring 134 allows the spring 134 to be rotationally twisted relative to its first end 160, and the resulting potential energy in the spring 134 is applied as a torsional force to the output shaft 116 via the connection of the second end 162 of the spring 134 to the output shaft 116. In some embodiments, the first end 160 of the spring 134 engages the chassis 182 and restricts rotation of the first end 160 of the spring 134 relative to the chassis 182. For example, the first end 160 of the spring 134 may include a non-circular outer periphery (see, e.g., FIGS. 6A-6C) that engages the chassis 182 to prevent rotation of the first end 160 of the spring 134 relative to the chassis 182.

The fluid tube 126 may be fluidly connected with the fluid connector 110 when the fluid connector 110 is coupled to the handle 102 to fluidly connect the fluid tube 126 to a fluid source, such as a reservoir coupled to a base station. One or more valves may be disposed between the fluid tube 126 and the fluid connector 110 to prevent fluid from leaking out of the handle 102 when the fluid connector 110 is not coupled to the handle 102. A battery, such as battery 184 shown in FIG. 2, may be positioned at a bottom end of the housing 180, and the fluid tube 126 may be routed from the first end 160 of the spring 134 and alongside the battery 184 to a fluid connection with the fluid connector 110. An upper portion of the fluid tube 126 may be aligned with a longitudinal centerline of the spring 134, while a lower portion of the fluid tube 126 may be laterally offset from the centerline of the spring 134.

With reference to FIG. 1B, a top portion of the output shaft 116 extends from the top end of the handle housing 180. To connect the work piece, such as brush head 104, to the top portion of the output shaft 116, the user presses the brush head 104 onto the output shaft 116, aligning the keyed surface 120 of the shaft 116 with a corresponding keyed surface within the brush head 104. Optionally, a clip or other retainer in the brush head 104 may be seated within the groove 122 on the output shaft 116 to further secure the brush head 104 to the output shaft 116. Upon connecting the brush head 104 to the output shaft 116, the outlet nozzle 108 of the brush head 104 is fluidly connected to the outlet 124 of the output shaft 116, and the brush head 104 is keyed with the output shaft 116 to oscillate therewith.

Operation of the electric toothbrush 100 will now be discussed in more detail. With reference to FIGS. 1A, 1B, and 2, during an irrigation mode, the user actuates a control button 114, which activates a pump, such as one within a base unit. As the pump operates, it pulls fluid from a reservoir and pumps it to the fluid connector 110. The fluid travels through the fluid connector 110 to the fluid tube 126, and through the fluid tube 126 to the nipple 146. At the nipple 146, the fluid enters the flow lumen 156 defined in the output shaft 116 and travels through the output shaft 116 to the shaft outlet 124. From the shaft outlet 124, the fluid travels through the brush head 104, exits the nozzle 108, and impacts a user's gums and teeth.

For a brushing function, the user may actuate the same control button 114 or another button to activate a drive signal. The drive signal, which may be generated by a controller or signal generator, and may be an alternating current (AC) signal, is provided to the electromagnets 140a, 140b. In some instances, the same signal is provided to both electromagnets 140a, 140b simultaneously, but due to the opposing winding directions WD1 and WD2 of the two windings 152a, 152b, the signal generates flux in opposite directions in the two electromagnets 140a, 140b. For example, the drive signal may be a sinusoidal shaped voltage waveform, such that the electromagnets 140a, 140b may be driven with the same magnitude, but 180-degrees out of phase.

Figure 7A:
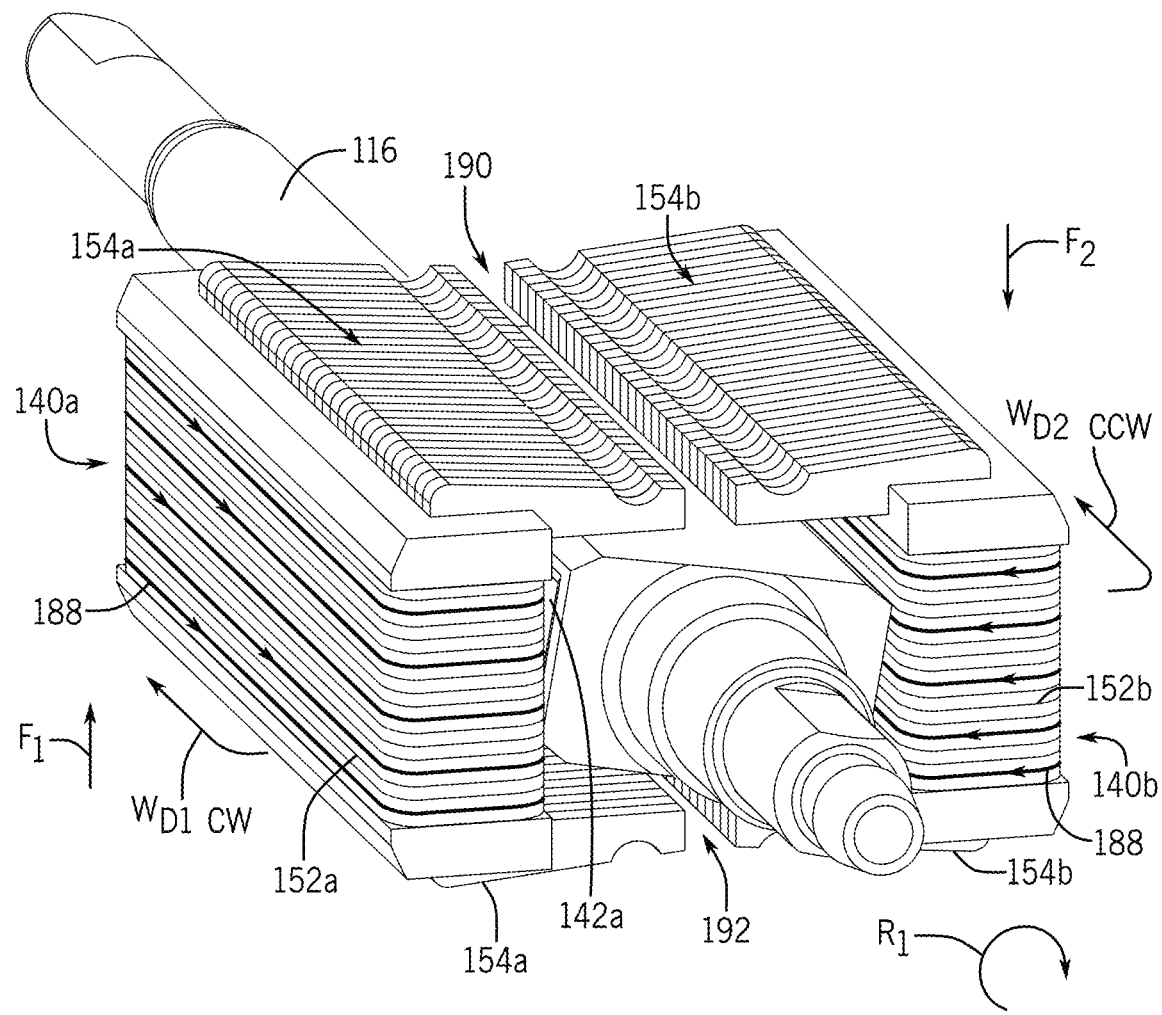
FIG. 7A is a bottom isometric view of activation of the drive train with a first signal.
Figure 7B:
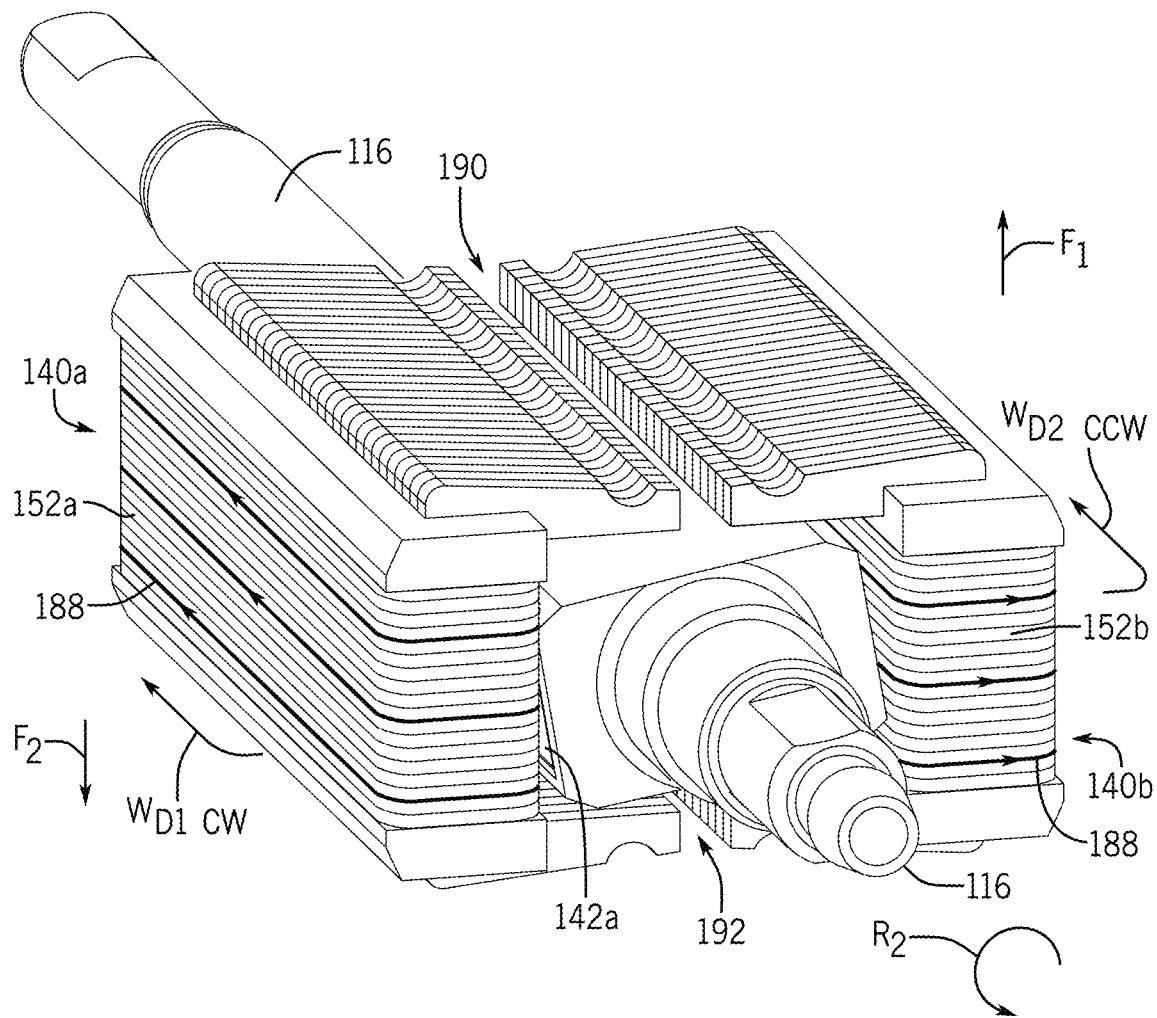
FIG. 7B is a bottom isometric view of the activation of the drive train with a second signal.

The flux generated at a given point in time may be in the opposite direction for the two electromagnets 140a, 140b. For example, with reference to FIGS. 7A-7B, a first flux direction F1 may be generated by the first electromagnet 140a and a second flux direction F2 may be generated by the second electromagnet 140b when the drive signal is in a first direction, and, as the drive signal reverses in direction, the flux directions for the two electromagnets 140a, 140b switch, such that the first electromagnet 140a generates flux in flux direction F2 and the second electromagnetic 140b generates flux in the first flux direction F1. As illustrated in FIGS. 7A-7B, the first flux direction F1 may move the respective permanent magnet 142a, 142b towards the first side 190 of the cores 154a, 154b of the electromagnets 140a, 140b, and the second flux direction F2 may move the respective permanent magnet 142a, 142b towards the second side 192 of the cores 154a, 154b of the electromagnets 140a, 140b, thereby rotating the output shaft 116 about its longitudinal axis.

With reference to FIGS. 3-4C and 7A, in the illustrated example, the first electromagnet 140a generates flux in the first direction F1, causing the first permanent magnet 142a to be moved towards a first side 190 of the cores 154a, 154b.

Simultaneously, the second electromagnet 140b generates flux in the second direction F2, causing the second permanent magnet 142b to be moved towards a second side 192 of the cores 154a, 154b, opposite the first side 190. These forces cause the output shaft 116 to rotate in a first direction R1, pivoting the brush head 104 therewith. In some instances, the output shaft 116 may rotate between about 5 to 30 degrees, and in one example may rotate about 10 degrees, in the first direction R1 from a neutral position.

With reference to FIGS. 3-4C and 7B, as the drive signal 188 reverses direction, the flux directions of the electromagnets 140a, 140b switch. Specifically, the first electromagnet 140a generates flux in the second direction F2, causing the first permanent magnet 142a to be moved towards the second side 192 of the cores 154a, 154b. Simultaneously, the second electromagnet 140b generates flux in the first direction F1, causing the second permanent magnet 142b to be moved towards the first side 190 of the cores 154a, 154b. These forces cause the output shaft 116 to rotate in a second direction R2, pivoting the brush head 104 therewith. In some instances, the output shaft 116 may rotate between about 5 to 30 degrees, and in one example about 10 degrees, in the second direction R2 from a neutral position.

As the electromagnets 140a, 140b generate magnetic forces acting on the output shaft 116, the spring 134 acts to amplify the forces. Specifically, the keyed connection between the output shaft 116 and the second end 162 of the spring 134, as well as the first end 160 of the spring 134 being non-rotatably coupled to the chassis 182, causes the beams 166 to deform in the first direction R1 as the output shaft 116 rotates in the first direction R1. At the desired oscillation angle of the output shaft 116 in the first direction R1, the beams 166 exert a rotational force in the opposite direction, e.g., direction R2. In this manner, the spring 134 acts with the electromagnets 140a, 140b to drive the output shaft 116 in the second direction R2. As the output shaft 116 rotates in the second direction R2, the spring 134 twists in the second direction R2, and at the desired oscillation angle of the output shaft 116 in the second direction R2, the beams 166 exert a return force in the opposite direction, e.g., direction R1, amplifying the rotation of the output shaft 116 in the first direction R1. In this manner, the spring 134 twists in opposite rotational directions to apply a spring force to the output shaft 116 that supplements the electromagnetic force generated by the electromagnets 140a, 140b to oscillate the output shaft 116. The spring 134 and the mass 136 may have a natural frequency that matches the oscillation frequency of the output shaft 116, such that the force provided by the spring 134 is amplified or enhanced.

The methods and systems are described herein with reference to combination irrigation and brushing cleansing devices. However, the methods and systems are equally applicable to other types of oral cleansing devices, e.g., toothbrushes. As such, the discussion of any particular embodiment is meant as illustrative only. Further, features and modules from various embodiments may be substituted freely between other embodiments.

In methodologies directly or indirectly set forth herein, various steps and operations are described in one possible order of operation but those skilled in the art will recognize the steps and operation may be rearranged, replaced or eliminated without necessarily departing from the spirit and scope of the present invention. It is intended that all matter contained in the above description or shown in the accompanying drawings shall be interpreted as illustrative only and not limiting. Changes in detail or structure may be made without departing from the spirit of the invention as defined in the appended claims.

The invention claimed is:

1. An electric toothbrush comprising:
a housing;
an output shaft positioned within and extending out of the housing;
a brush head releasably coupled to the output shaft and movable therewith relative to the housing, wherein the output shaft is hollow to deliver fluid to the brush head;
a magnetic assembly positioned within the housing and configured to impart an oscillation motion to the output shaft;
a mass; and
a spring positioned within the housing, the spring including a first end non-rotatably coupled to the housing and a second end non-rotatably coupled to the output shaft and coupled to the mass, wherein the spring twists as the magnetic assembly oscillates the output shaft to amplify the oscillation motion of the output shaft generated by the magnetic assembly, and wherein the spring accommodates a fluid flow path through an interior of the spring to the output shaft.

2. The toothbrush of claim 1, wherein the spring is formed of plastic and the mass is formed of a heavier material than the spring, and wherein the mass and the spring are configured to together define a natural frequency that corresponds to an oscillation frequency of the output shaft.

3. The toothbrush of claim 1, wherein the mass is formed of metal and surrounds the second end of the spring.

4. The toothbrush of claim 1, wherein the spring further includes a plurality of beams extending from the first end to the second end of the spring, wherein the plurality of beams are positioned around and define in part a longitudinal cavity extending along a central axis of the spring.

5. The toothbrush of claim 4, wherein each beam of the plurality of beams includes expanded base ends at each a first end of the spring and a second end of the spring, wherein the base ends taper inwardly toward a central portion of the beam.

6. The toothbrush of claim 4, wherein the plurality of beams define arched openings between adjacent beams of the plurality of beams.

7. The toothbrush of claim 1, wherein the magnetic assembly comprises:
a first permanent magnet and a second permanent magnet attached to opposing sides of the output shaft and rotatable therewith; and
a first electromagnet and a second electromagnet positioned within the housing on opposing sides of the output shaft, the first electromagnet positioned adjacent the first permanent magnet and fixed in position relative to the housing, and the second electromagnet positioned adjacent the second permanent magnet and fixed in position relative to the housing.

8. The toothbrush of claim 7, wherein the first permanent magnet has a first outwardly facing polarization and the second permanent magnet has a second outwardly facing polarization, opposite of the first outwardly facing polarization, and both the first and second permanent magnets extend lengthwise in a longitudinal direction of the output shaft.

9. The toothbrush of claim 7, wherein the magnetic assembly further comprises a magnet housing attached to the output shaft, and wherein the first permanent magnet and the second permanent magnet are coupled to opposing sides of the magnet housing.

10. The toothbrush of claim 7, wherein:
the first electromagnet has windings extending in a first direction; and
the second electromagnet has windings extending in a second direction opposite the first direction, such that application of a signal to both the first electromagnet and the second electromagnet generates flux paths in opposing directions.

11. The toothbrush of claim 10, wherein the signal comprises a sinusoidal alternating current signal.

12. The toothbrush of claim 7, wherein the output shaft is positioned between the first permanent magnet and the second permanent magnet.

13. The toothbrush of claim 1, further comprising a fluid tube routed through the spring and coupled to the output shaft to deliver fluid to the brush head.

14. An electric toothbrush comprising:
a handle housing;
a hollow output shaft having an inlet end and an outlet end, wherein the inlet end is positioned within the housing, and wherein the outlet end extends out of the housing and is connectable to a brush head;
first and second permanent magnets positioned within the housing and fixed to opposing sides of the output shaft so as to rotate therewith;
first and second electromagnets fixed in position relative to the housing and positioned on opposing sides of the output shaft;
a spring including a first end non-rotatably connected to the housing, a second end non-rotatably connected to the inlet end of the output shaft, and a plurality of beams extending from the first end of the spring to the second end of the spring;
a mass non-rotatably connected to the second end of the spring and formed from a different material than the spring; and
a fluid tube routed through the first end of the spring and coupled to the inlet end of the output shaft within the spring to deliver fluid to the brush head.

15. The toothbrush of claim 14, wherein the inlet end of the output shaft includes a nipple for fluidly coupling the fluid tube to the inlet end of the output shaft.

16. The toothbrush of claim 14, wherein the output shaft is rectilinear and the fluid tube is coupled to the inlet end of the output shaft along a longitudinal centerline of the output shaft.

17. The toothbrush of claim 14, wherein the output shaft extends through the second end of the spring along a longitudinal centerline of the spring.

18. An activation method for an electromagnetically driven toothbrush comprising a hollow output shaft to deliver fluid to a brush head, and a spring accommodating a fluid flow path through an interior of the spring to the output shaft, the activation method comprising:
activating a first stationary electromagnet, positioned adjacent a first side of the output shaft and having a first winding direction, and a second stationary electromagnet, positioned adjacent a second side of the output shaft and having a second winding direction opposite the first winding direction, with a first signal to rotate the output shaft in a first direction, wherein both the first stationary electromagnet and the second stationary electromagnet generate rotational movement of the output shaft in the first direction in response to the first signal; and
activating the first stationary electromagnet and the second stationary electromagnet with a second signal to rotate the output shaft in a second direction opposite the first direction, wherein both the first stationary electromagnet and the second stationary electromagnet generate rotational movement of the output shaft in the second direction in response to the second signal.

19. The activation method of claim 18, wherein the first signal corresponds to a positive amplitude of a sinusoidal alternating current waveform, and the second signal corresponds to a negative amplitude of the sinusoidal alternating current waveform.

20. The activation method of claim 18, wherein the output shaft includes a first permanent magnet having a first polarization on the first side of the output shaft and a second permanent magnet on the second side of the output shaft, wherein the first permanent magnet is oriented such that a north pole faces outwards from the output shaft and the second permanent magnet is oriented such that a south pole faces outwards from the output shaft.

* * * * *